US007733591B2

United States Patent
Bottemiller et al.

(10) Patent No.: US 7,733,591 B2
(45) Date of Patent: Jun. 8, 2010

(54) DATA STORAGE DEVICE WITH DATA RECOVERY PROCESS USING FIXED PHASE CLOCKING FOR ANALOG-TO-DIGITAL CONVERSION

(75) Inventors: Kraig Bottemiller, Rochester, MN (US); Richard Leo Galbraith, Rochester, MN (US); Weldon Mark Hanson, Rochester, MN (US); Travis Roger Oenning, Rochester, MN (US); Michael Joseph Ross, Rochester, MN (US); Fuminori Sai, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 523 days.

(21) Appl. No.: 11/641,322

(22) Filed: Dec. 18, 2006

(65) Prior Publication Data

US 2008/0144454 A1   Jun. 19, 2008

(51) Int. Cl.
*G11B 5/09* (2006.01)
*G11B 15/52* (2006.01)
*G11B 19/02* (2006.01)
*G11B 5/02* (2006.01)
*G11B 20/18* (2006.01)

(52) U.S. Cl. .................. 360/51; 369/47.14; G9B/5.026; G9B/20.055

(58) Field of Classification Search ........................ None
See application file for complete search history.

(56) References Cited

U.S. PATENT DOCUMENTS

| 5,220,569 | A |   | 6/1993 | Hartness |
| 5,233,482 | A | * | 8/1993 | Galbraith et al. .............. 360/46 |
| 5,918,001 | A |   | 6/1999 | Ueno et al. |
| 6,049,439 | A |   | 4/2000 | Ono et al. |
| 6,084,733 | A |   | 7/2000 | Ohzeki et al. |
| 6,130,794 | A |   | 10/2000 | Christensen |
| 6,345,366 | B1 |   | 2/2002 | Asano et al. |
| 6,392,830 | B1 |   | 5/2002 | Malone, Sr. |
| 6,490,691 | B1 |   | 12/2002 | Kimura et al. |
| 6,530,034 | B1 |   | 3/2003 | Okada et al. |
| 6,594,094 | B2 |   | 7/2003 | Rae et al. |
| 6,937,415 | B2 | * | 8/2005 | Galbraith et al. .............. 360/53 |
| 2004/0156138 | A1 |   | 8/2004 | Yun |

* cited by examiner

*Primary Examiner*—Daniell L Negron
(74) *Attorney, Agent, or Firm*—G. Marlin Knight

(57) ABSTRACT

The invention includes apparatus and methods that allow a data storage device perform an enhanced data recovery procedure (DRP) that includes obtaining a new digital sampling of the voltages for the failing unit of data by re-reading the analog signal and converting it to digital form using an analog-to-digital conversion (ADC) using a fixed phase clock signal. The data samples are re-interpolated using a programmable delay line. The digital values representing the voltages are stored a buffer so that the data can be processed repeatedly using varying parameters as part of the data recovery procedure. Optionally the samples stored in the buffer can be processed in the reverse direction (from end of sector to beginning of sector) without requiring modification of the standard Viterbi detector since it inherently works on data processed in either direction.

17 Claims, 4 Drawing Sheets

DATA STORAGE DEVICE WITH DATA RECOVERY PROCESS USING FIXED PHASE CLOCKING FOR ANALOG-TO-DIGITAL CONVERSION

FIELD OF THE INVENTION

The invention relates to the field of data storage devices and more particularly to apparatus and methods for recovering data when errors occur during reading of data.

BACKGROUND OF THE INVENTION

Data storage devices used with computers use various techniques for storing the data including optical, magnetic and optomagnetic methods. The following will focus on magnetic disk drives for simplicity, but the invention is not limited to use with magnetically stored data.

Data in magnetic disk drives is recorded in concentric, radially spaced tracks arranged on the planar surfaces of one or more disks. Magnetic films on the disks are used to record bits of information in the form of magnetic domains. When operating the disks are rotated on a spindle and magnetic heads are mechanically positioned over the tracks to read and write data from the disks. Permanent servo information is typically written on the disk at the time of manufacture that allows the system to ascertain the radial and circumferential position of the head within certain limits. The tracks are typically subdivided into many sectors that can be read and written independently.

In addition to the permanent servo information, magnetic signals are written on the disk to record various information for users. Special sync fields are included with the data to aid detecting the starting positions. A sync field typically is architected at the start of the sector. The data is recorded in special patterns that aid in the detection and recovery from errors caused by noise, magnetic defects, and so forth. For example, channel codes are mappings of data bits into symbols that avoid certain characteristics in the bit-stream of symbols that make recovery of the data bits more difficult. In addition, parity frames and error correction code (ECC) blocks are used to detect and correct various bit errors. When errors are encountered that cannot be corrected by these initial error correction techniques, a more extensive data recovery procedure (DRP) is invoked.

In a magnetic data recording device the data channel is the portion of the system responsible for decoding the information recorded in the signals read from the disk. The analog signal is first converted into digital form before being fed through the channel detector. The detector typically uses Partial Response Maximum Likelihood (PRML) principle to convert the string of digitized voltage values into binary data bits. The typical channel hardware can accept variables or parameters that act to modify the way the raw data stream is decoded. Unwanted variations in the amplitude, frequency, phase, resolution and overwrite properties can result in corruption of the written data. Some errors are permanent while others are transient. Re-reading a sector during data recovery procedure (DRP) requires a relatively large amount of time because a full rotation of the disk is needed before the sector comes back around under the head. Although a sector may be re-read many times during DRP, minimizing the number of re-reads is clearly desirable.

U.S. Pat. No. 6,937,415 (Aug. 30, 2005) to Galbraith, et al. describes the use of a sample buffer to store problem data for analysis during a data recovery procedure (DRP). The data in the buffer can be repeatedly processed during the DRP without having to re-read the sector a third time. However, the data in the buffer can be used for characterization of error information for the purpose of enhancing the effectiveness of a subsequent third (or more) re-readings. Using the data stored in the buffer enables data recovery without identification of a sync field and enables DRP to use changed channel data detection settings to aid in recovering the data. Adaptive equalization is used to enhance recovery during a subsequent re-read of the data sector; and extraction of timing information to allow introduction of timing loop changes during a re-read to offset phase or frequency related timing errors. A procedure involving movement of a pointer into the buffer to allow the data to be correctly framed and read with ECC is described. The '415 patent also notes that the buffer can be used to accumulate data from several different readings of the problem sector in effect averaging the data from multiple reads. By accumulating the results of more than one read operation some or all of the noise can be averaged out.

SUMMARY OF THE INVENTION

The invention includes apparatus and methods that allow a data storage device to perform an enhanced data recovery procedure (DRP). An embodiment of a DRP according to the invention obtains a new digital sampling of the failing unit of data by re-reading the analog signal and converting it to digital form using an analog-to-digital conversion using a fixed phase clock signal. By using a fixed phase clock the sampling is made asynchronous to content of the analog signal, which is not the case during standard operation. In an embodiment of the invention the analog-to-digital converter (ADC) is driven with an unmodulated phase-locked loop (PLL) clock during the re-reading process. The PLL clock can optionally include positive frequency offset to achieve over-sampling. When the digitized samples are obtained with a stable clock source and fixed signal gain, the samples are not biased or distorted by the gain and timing loops of the normal synchronous techniques which have already failed to properly detect the data. The data is re-interpolated using a programmable delay line with flat magnitude and linear phase response. Fixed signal gain is preferred when the analog sector is re-read to avoid problems induced by automatic gain control. If fixed gain is used, then signal level adjustments may be needed when the data is processed through the detector.

In an embodiment of the invention, digital data is stored in a buffer so that the data can be processed repeatedly at high speed using varied parameters as part of data recovery procedure. For each re-run (iteration), parameters including those related to re-interpolation and amplitude adjustment can be changed in a trial-and-error effort to recovery the data. The success or failure an iteration to decode a unit of data is preferably determined by the ECC system according to the prior art. Defect and erasure locations can be determined. If necessary synchronization can be obtained by varying the assumed starting point in the buffer at which the data is fed into the detector.

When the samples are stored in a buffer, optionally the data can be processed in the reverse direction (from end of sector to beginning of sector). The implementation of this option requires that the data in the buffer be fed into the detector in reverse order, but the Viterbi portion of the detector requires no modification since it inherently works on data processed in either direction. Reverse processing can allow recovery of data when a large defect causes a phase shift in the middle of the sector. In an alternative embodiment sync-field marks are placed at the end of the sector as well as the beginning in order to aid in processing the data in the reverse order.

The data stored in a buffer can be processed by hardware and software that are not used in normal decoding process. This allows optional analysis techniques to be used. These include fast Fourier transform (FFT) and discrete autocorrelation. Optional analysis techniques can be implemented in hardware, software or a combination of hardware and software. The frequency offset of the acquired samples can be determined accurately by analyzing the captured samples. This will allow for accurate setting of the frequency offset for sample interpolation to obtain synchronous samples.

DETAILED DESCRIPTION OF THE INVENTION

After the standard, initial error recovery attempts have failed, a data storage device typically goes into data recovery procedure (DRP) mode. A data storage device according to the invention includes data recovery procedure (DRP) that can be used in addition to any other prior art data recovery procedures. In an embodiment of the invention the DRP re-reads the analog signal for the unit of data (typically a sector) that has generated an error when processed in the standard way through the detector. Because the raw signal has unknown defects that caused the normal processing to fail, it is beneficial to limit or isolate the effects that these defects have on the decoding process. In an embodiment of the invention a fixed signal gain is used when the problem data sector is re-read in order to avoid the deleterious effects that the defects in the signal may have had on the automatic gain adjustment process that is normally used.

Another way that defects in the raw signal can disrupt the decoding process is through adverse effects on the ADC clocking that arise through the phase-feedback supplied to the phase-locked loop (PLL). The clocking of the ADC in DRP mode according to an embodiment of the invention allows the deleterious effect of defects in the raw signal on the clocking of the ADC to be avoided. Making the phase of the clocking of the ADC independent from the characteristics of the raw signal in turn makes the sampling (digitization) of the raw data stream independent from the characteristics of the raw signal. In an embodiment of the invention the clocking for the analog-to-digital converter (ADC) during the re-read is made to be independent (asynchronous) from the characteristics of the data by eliminating the phase adjustment that is normally used by the phased-locked loop (PLL) circuitry that supplies the clocking. In this way the digital representation of the raw analog signal in the DRP of the invention is different from the standard digital representation of the raw analog signal and will allow recovery from errors that would otherwise not be recoverable.

Figure 1:
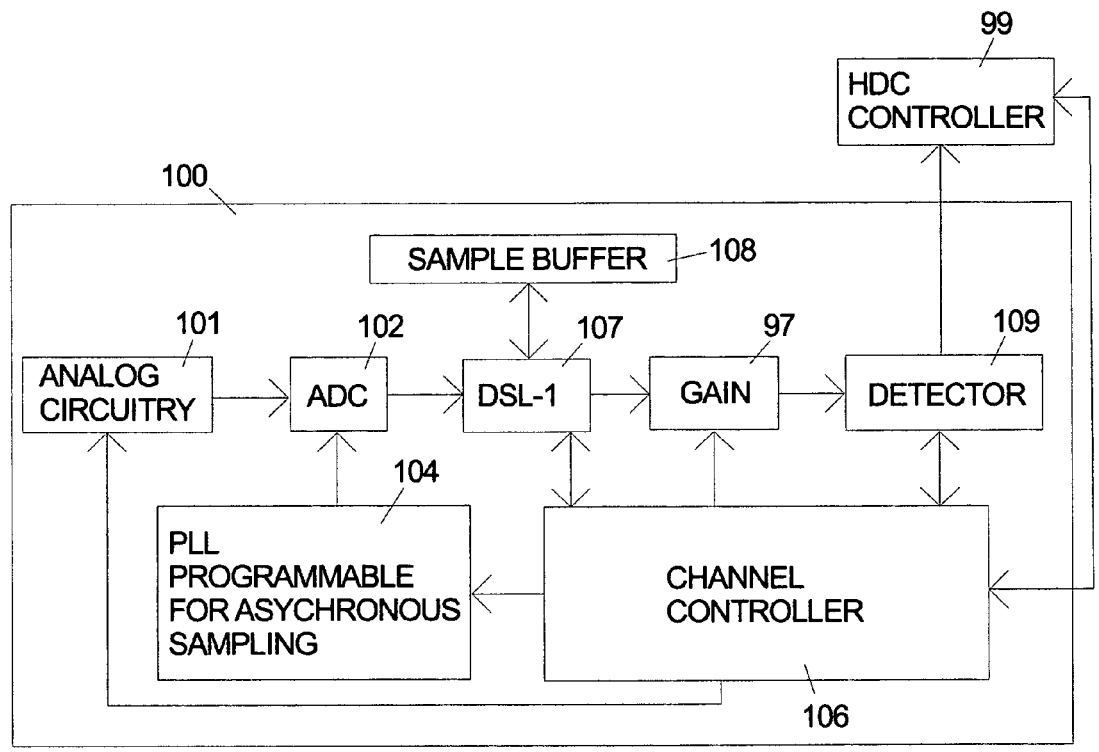
FIG. 1 is a block diagram illustrating selected components in a data storage device according to a first embodiment of the invention.

FIG. 1 is a block diagram illustrating selected hardware components in an embodiment of the invention. The diagram illustrates Channel 100 and Hard Disk Controller (HDC) 99 which are part of a data storage device. The analog signal read from the storage medium is processed by the Analog Circuitry 101 before being fed into the Analog-to-Digital Converter (ADC) 102. The Analog Circuitry 101 has programmable gain modes that include the normal operating mode in which automatic gain adjustments are made based on feedback from the signal as it is read. Preferably the Analog Circuitry 101 also has a selectable mode in which the gain is fixed. The fixed gain mode is preferably selected by the Channel Controller 106 for re-reading the problem sector in DRP mode. If fixed gain is used, then signal level adjustments may be needed when the data is processed as will be described below.

The clocking for the ADC 102 is supplied by Phase-Locked Loop (PLL) 104 that is controlled by the Channel Controller 106. The PLL 104 has at least two modes of operation that are selectable. In normal operation the PLL 104 adjusts the phase of the clocking pulse using feedback derived from the analog signal. In order to achieve asynchronous clocking in the DRP mode the feedback is internally disconnected (eliminated) inside the PLL circuitry based on control signals from the Channel Controller 106. The clocking for the ADC will then have a fixed phase that is independent (asynchronous) from the characteristics of the raw analog signal in the defective area. The timing (period/frequency) of the fixed clocking signal can be set based on defaults or from a value derived from a previous sector that was read without errors. In addition it may be desirable to increase the rate of the ADC clocking by a small amount, for example, 1% or 2% over nominal to achieve over-sampling.

Although it may be possible to only re-read the failing sector one time using the invention, optionally the failing sector can be re-read additional times. One technique that can be employed is to use signal averaging as described in U.S. Pat. No. 6,937,415 (Aug. 30, 2005) to Galbraith, et al. It is also possible to re-read the failing sector using different parameters that can be derived from analysis of the data in the buffer.

In the embodiment of FIG. 1 the output of the ADC 102 goes through Data Switching Logic-1 (DSL-1) 107 which provides for alternate routing of the data to implement the invention. In normal operation the data is fed directly into the Detector 109 in real-time. In DRP mode the digital data for the sector is preferably stored in the Sample Buffer 108 which allows off-line or batch processing of the data. The data can optionally be stored in the Sample Buffer 108 during normal operation as well. When the process according to the invention is being executed in DRP mode, the DSL-1 unit routes the data being read into the Sample Buffer 108. Once the problem unit of data (e.g. a sector) has been read, the content of the Sample Buffer is locked so that subsequent units of data will not overwrite the data in the Sample Buffer. In DRP mode, the DSL-1 also disconnects the real-time flow of data from the ADC into the Detector 109 which allows the data in the Sample Buffer to be processed off-line.

The digital data in the Sample Buffer represents sampled voltage values from the analog signal read from media. The voltage values are recorded as N-bits, where N might be, for example, 6 or 8 bits. As in the prior art, a PRML-type detector is used to convert the N-bit digital form of data into a second set of digital data that includes essentially one data bit for each of the N-bit voltage values.

The N-bit voltage values may require adjustment to correct for the fact the analog signal was re-read without automatic gain control (AGC) as described above. Gain Adjustment Unit 97 is used to adjust the amplitude levels of the N-bit data in DRP mode according to the invention before the data is processed through the Detector 109. The Gain Adjustment Unit 97 operates under the control of the Channel Controller 106 and can be implemented as programmable multiplier that scales the amplitude of the N-bit samples up or down. The scaling parameter can be supplied by Channel Controller 106 and can be varied during the processing of a unit of data, as well as between iterations. In an alternative embodiment the amplitude adjustment can take place after the re-interpolation. In this alternative embodiment the Gain Adjustment Unit 97 would conceptually become part of the Detector 109.

The internals of Detector 109 will be further described below in connection with FIG. 2. By controlling the flow of the data into the Detector 109 the DSL-1 allows the normal real-time operation to be suspended. This enables the data in the Sample Buffer 108 to be process and fed through Detector 109 as many times as necessary using different parameters and different starting points. In addition, this arrangement allows an optional embodiment to be implemented in which the data in Sample Buffer 108 can be fed into the Detector 109 in reverse order as one of several methods that can be used to attempt to decode the problem data.

The sequence of events is controlled by Channel Controller 106 after the failure event that triggers the DRP mode is detected. Channel Controller 106 sets the asynchronous mode on the PLL, sets the signal gain to a fixed value and selects the appropriate switch settings in the DSL-1. The actual re-reading of the failing sector is accomplished by the Hard Disk Controller 99 which controls the mechanical elements of the disk drive.

The Channel Controller 106 sets parameters used when the problem data is processed. These included parameters for the Gain Adjustment Unit 97, as well as the parameters for Detector 109, which in this embodiment include the parameters used in re-interpolating the data. The stored data in the Sample Buffer can also be read by the Channel Controller 106 to enable independent analysis separate from the Detector 109. The stored samples can be reprocessed potentially hundreds of times during the time for one revolution of the disk. For each iteration, variables can be adjusted in an effort to find a set of conditions that will result in correct decoding of the data. Parameters for the decoder such as equalization or Viterbi path weighting can also be set to various values in an effort to recover the data. The Detector 109 may also generate error signals that can be read by the Channel Controller 106 and used to make adjustment to the parameters for subsequent runs. When the correct parameters are found, the N-bit data will decode properly into the binary data and this will be confirmed by a correct ECC result according to prior art techniques. Because ECC can correct some errors, the iterative trial and error process succeeds when all of the remaining errors are correctable by ECC.

Additional analysis techniques can be employed for the N-bit data stored in the buffer using any combination of hardware, software or firmware. Any prior art analysis technique can be used. Examples include fast Fourier transform (FFT) and discrete autocorrelation. Optionally the frequency offset of the acquired samples can be determined accurately by analyzing the captured samples which will allow for accurate setting of the frequency offset for sample interpolation to obtain synchronous samples. Defect and erasure locations can be determined this way as well.

The data in the buffer can also be used develop error information for the purpose of enhancing the effectiveness of a subsequent re-read of the problem unit of data. Adaptive equalization can be used to enhance recovery during a subsequent re-read and extraction of timing information can allow timing loop changes during a re-read to offset phase or frequency related timing errors.

Embodiments of the invention include means for achieving bit-synchronization and word-synchronization in the N-bit sample stream. In the case where the word sync pattern is erased or unreadable at the start of the unit of data, finding the correct starting point in the buffer may require a trial and error process in which various starting positions are tried. The system could, for example, try each of the first few hundred integral positions in the Sample Buffer to cover the uncertainty of where the correct data starts. At each assumed starting position the data would be processed to determine whether the data will decode correctly using that starting point.

Figure 2:
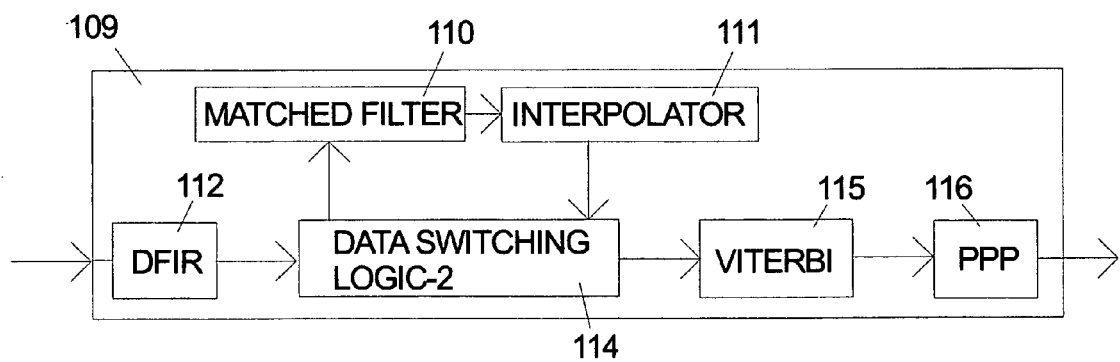
FIG. 2 is a block diagram illustrating selected components in a detector according to a first embodiment of the invention.

FIG. 2 is a block diagram illustrating selected components in a Detector 109 according to a first embodiment of the invention. Uncertainty in the correct fractional position of the sample points can be introduced by the defects in analog signal, as well as by the asynchronous sampling used in the invention. The asynchronous clocking of the ADC sampling can result in the synchronization of the N-bit samples being slightly off from the ideal positions. Therefore, an embodiment of the invention includes means for re-interpolating the sample points. Bit-synchronization can be regained/obtained by running the data through a matched filter and interpolator that act as a programmable delay line with flat magnitude and linear phase response. The sample points are, in effect, re-interpolated.

A programmable fractional-bit delay function with flat magnitude and linear phase response is used. In the embodiment shown in FIG. 2, during normal operation the data goes through Discrete Finite Impulse Response (DFIR) filter 112 into Data Switching Logic-2 (DSL-2) 114 and then into the Viterbi detector 115 and subsequently into the Post-Processor Parity (PPP) 116. The Detector 109 also includes Matched Filter 110 and Interpolator 111 that are used in DRP mode according to the invention to re-interpolate the samples before they are processed through the Viterbi detector 115 and the Post-Processor Parity (PPP) 116. The Matched Filter 110 and Interpolator 111 act to delay bits in the data stream by a programmable amount that includes fractional bit-times. For example, an implementation might allow fractional bit delays in minimum increments of $\frac{1}{64}$, but larger increments of perhaps $\frac{1}{16}$ might be selected.

Figure 6:
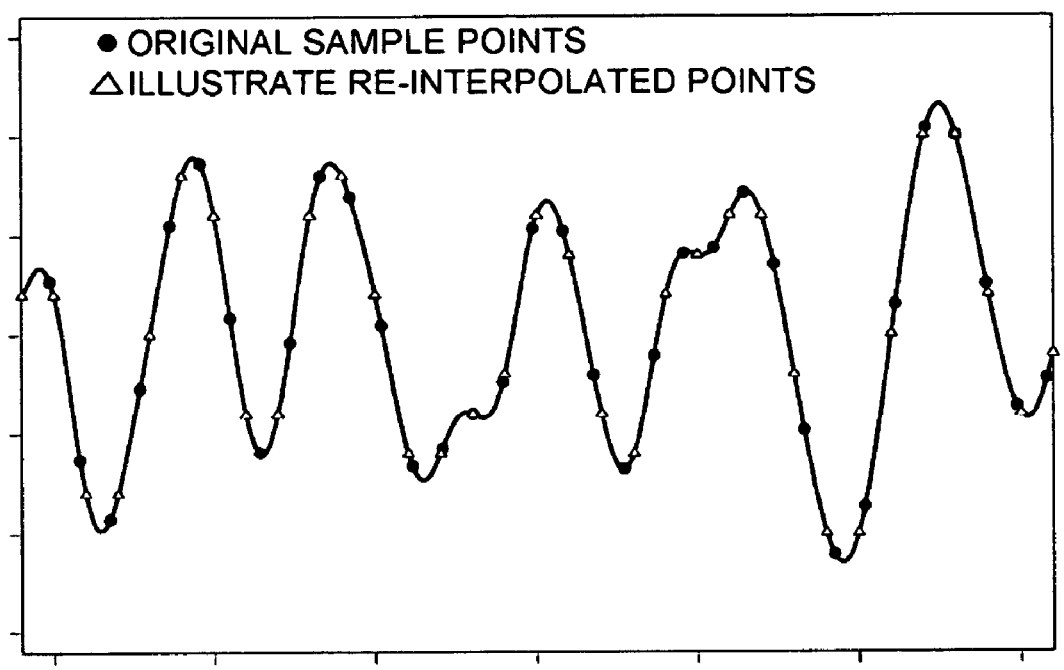
FIG. 6 is a chart illustrating the effect of the re-interpolation used in an embodiment of the invention.

The effect of the re-interpolation is illustrated in FIG. 6. The solid line represents the analog signal read from the storage media. The black dots represent the asynchronous sample points used by the ADC according to the invention. The triangles represent the re-interpolated sample points according to the invention. The effect of the Matched Filter 110 and Interpolator 111 is to delay the sample points by a programmable amount that is derived from the characteristics of the data immediately preceding the sample being processed. The number of previous samples that are used can vary with the design. For example, an implementation might use the previous eight samples with selected weightings to obtain the new interpolation point. The effect is to vary the phase of the sampling.

Figure 3:
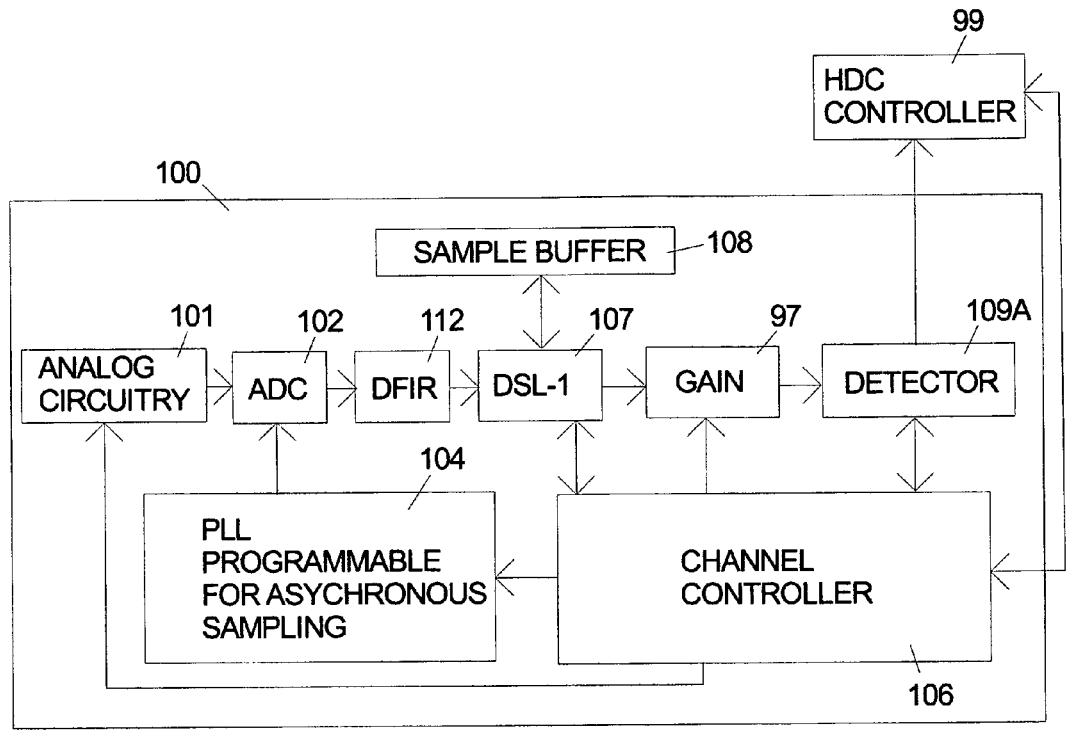
FIG. 3 is a block diagram illustrating selected components in a data storage device according to a second embodiment of the invention.
Figure 4:
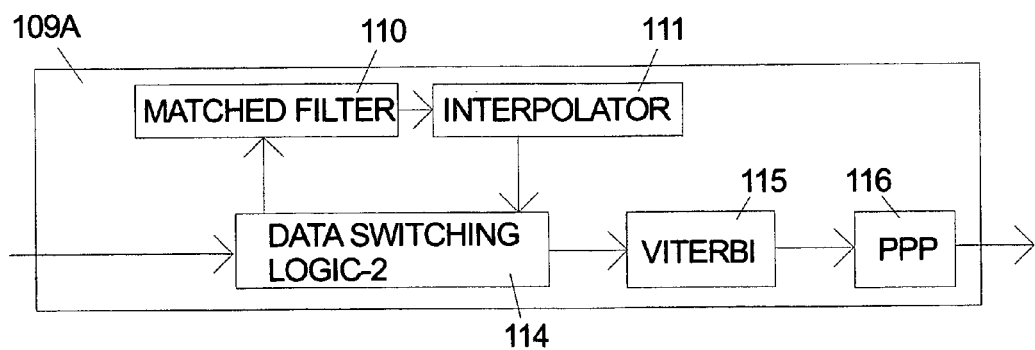
FIG. 4 is a block diagram illustrating selected components in a detector according to a second embodiment of the invention.

In alternative embodiments of the invention, any linear processing of the data can be performed before the data is placed in Sample Buffer 108. FIG. 3 illustrates a second embodiment of the invention Channel 100A in which the DFIR 112 is placed ahead of the Sample Buffer 108. Because the DFIR 112 is a linear filter, it can appear ahead of or after the Sample Buffer without altering the content of the data that arrives at the Matched Filter 110 and Interpolator 111. As shown in FIG. 4, the Detector 109A in this second embodiment does not have the DFIR since the function has already been performed.

Since the N-bit sample values are stored in a buffer, it is possible to process the data in the opposite direction (backwards) from the standard order of processing. In this option the processing starts at the end of the unit of data and works back toward the beginning. This can allow recovery of data when a large defect of phase shift occurs in the middle of the sector. The DRP processing can include many trial and error steps as part of the overall process of searching for a set of parameters, starting points, etc. that will yield a correctly decoded result. The backwards processing according to the invention is optionally one approach that can be tried in one or more iterations.

In order to facilitate processing in the reverse order in an embodiment of the invention, the system design can include writing sync marks at the end of each unit of data in addition to sync marks at the beginning as is done in the prior art. To implement backwards processing it is necessary to process the N-bit values in the Sample Buffer 108 in the reverse order. The principle of operation of the Viterbi decoder 115 inherently functions the same whether the data is run backwards or forwards; therefore, neither the Viterbi decoder 115 nor Post-Processor Parity (PPP) logic 116 has to be modified. The reverse processing order of the N-bit values in the Sample Buffer 108 can be achieved as a selectable function controlled by the DSL-1 107 which is in turn controlled by the Controller 106. Alternatively the reverse order reading from the Sample Buffer 108 could be selected under direct control of the Channel Controller 106.

When the data is processed in reverse order, the data stream coming out of the PPP 116 will be in reverse order and will need to be put back in forward order. This can be accomplished in a variety of ways. One way would be to have the Hard Disk Controller (HDC) 99 load the data into its buffer in reverse order when signaled by the Channel Controller that the data coming out is in reverse order.

Figure 5:
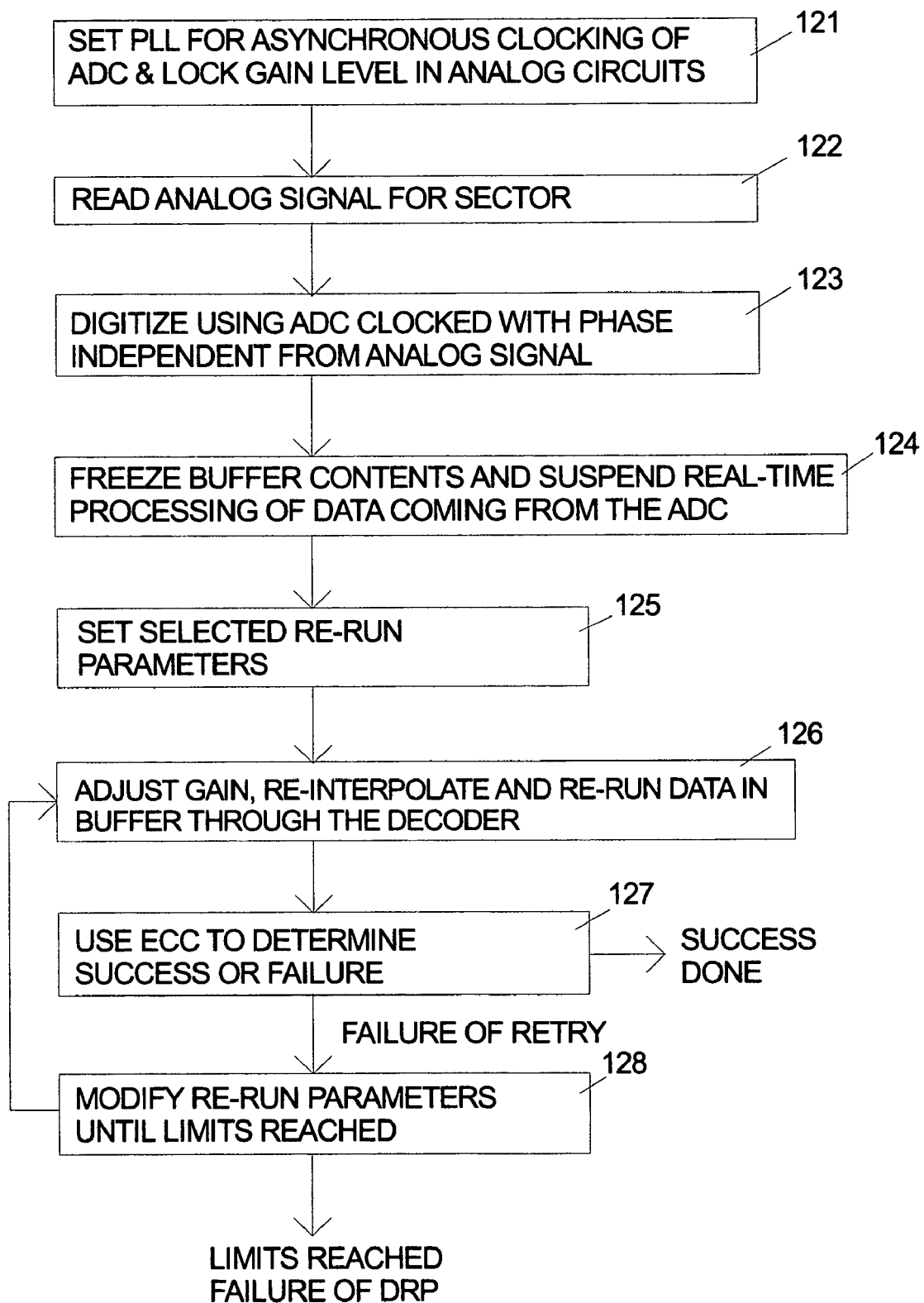
FIG. 5 is a flowchart illustrating a method according to an embodiment of the invention.

FIG. 5 is a flowchart illustrating a method according to an embodiment of the invention. The method is executed when the initial standard processing fails to correct an error. The system prepares to re-read to failing unit of data by setting the phase of the clocking of ADC to be independent from the analog signal 121. In standard operation mode the PLL, which is typically used to generate the clocking signal, adjusts the phase of the clock using feedback from the analog signal. Therefore, a second operating mode of the PLL is selected in which the phase of the clock is not adjusted based on feedback. The gain level used by the analog circuitry is preferably set to a fixed value for the re-read 121. The analog signal for the failing unit of data (e.g. sector) is then re-read which will typically be under the control of the Hard Disk Controller 122. The resulting analog signal is digitized into N-bit values by the ADC using the clocking that is phase-independent 123. The contents of the buffer are frozen after the sector has been stored in the buffer, i.e., the real-time processing of data is suspended 124. The optional analysis of the data in the buffer by software and/or hardware can be conducted at this point. The optional analysis may result in the selection of processing parameters that will aid in recovering the data.

The system selects an initial set of parameters for the detector for the first re-run of the data 125. The parameters include those used to re-interpolate sample points and to adjust the signal amplitude. The iterative processing loop includes adjustment the amplitude of the N-bit digital voltage values that are fed into the detector to correct for possible problems arising from the use of flat gain as described above. Optionally the starting point in the sample buffer can be varied between the runs. Varying the starting point in integral N-bits units may help achieve word synchronization. Fractional bit adjustments made by the re-interpolation process may help achieve bit-synchronization where it is otherwise lost. Once a set of parameters has been determined the data can be re-processed through the detector by setting the switching logic to feed the buffer contents into the detector 126. The success or failure of the effort to decode a unit of data can be ultimately determined by the ECC system according to the prior art. The ECC system can conceptually be located inside the Channel or the HDC, but the success or failure signal should be available in the DRP mode in order to know when a trial decoding iteration has succeeded. If the Detector succeeded in decoding the data, then the DRP is finished 127.

The Detector may also supply specific data about the results of the process that can be used by the Channel Controller to modify the parameters for the next run. Unless criteria for ending the DRP process have been met, the Channel Controller modifies the parameters for the next iteration of the processing of the data 128. The process loops back to step 126 to re-run the data again with at least one different parameter. The process terminates upon successful decoding, but there must also be some way to end the process in failure. For example, if the set of allowable parameters has been exhausted or other criteria such as retry limits have reached, the DRP process ends in failure.

The foregoing detailed description is provided for specific embodiments of the invention and should not be taken as limitations on the invention. Although block diagrams are used to describe the conceptual units of circuitry, these conceptual units should not be interpreted to be physically separate elements. It is typical for most or all of the circuitry that is referred to generically as a channel to be implemented on a single integrated circuit.

The invention claimed is:

1. A method of operating a data storage device comprising:
   detecting an error in processing a unit of data in a first mode of operation which includes converting an analog signal for a unit of data into first set of digital data representing voltage values using an analog-to-digital converter driven by a clock signal having a phase that is automatically adjusted based on feedback from the analog signal;
   after detecting the error, re-reading the analog signal for the unit of data from media and converting the analog signal for the unit of data into a second set of digital data representing voltage values using the analog-to-digital converter driven by a clock signal having a phase that is independent from the analog signal; and
   interpolating the second set of digital data using a selected fractional bit delay.

2. The method of operating a data storage device according to claim 1 further comprising storing the second set of digital data in a buffer.

3. The method of operating a data storage device according to claim 2 further comprising processing the second set of digital data through a detector to derive a set of binary data.

4. The method of operating a data storage device according to claim 1 wherein the step of interpolating the second set of digital data a selected fractional bit delay further comprises processing the second set of digital data using a programmable delay line.

5. The method of operating a data storage device according to claim 4 wherein the programmable delay line has a flat magnitude and linear phase response.

6. The method of operating a data storage device according to claim 4 wherein the programmable delay line has a fractional bit delay capability in increments of 1/16 of a bit or less.

7. The method of operating a data storage device according to claim 1 further comprising storing the second set of digital data in a buffer and iteratively processing the second set of digital data through a detector using selected parameters where at least one parameter changes with each iteration, the processing continuing until the second set of digital data is successfully decoded or end conditions are met.

8. The method of operating a data storage device according to claim 7 wherein iteratively processing the second set of digital data further includes selecting starting points in the buffer other than a first position in the buffer for at least one iteration.

9. The method of operating a data storage device according to claim 1 further comprising storing the second set of digital data in a buffer and iteratively processing the second set of digital data through a detector, and wherein at least one iteration of the processing includes feeding the second set of digital data through a detector in a reverse order by starting at an end of the second set of digital data in the buffer and proceeding backwards toward the beginning of the second set of digital data in the buffer, the processing continuing until the second set of digital data is successfully decoded or end conditions are met.

10. The method of operating a data storage device according to claim 1 wherein re-reading the analog signal further comprises using a fixed signal gain level before converting the analog signal for the unit of data into second set of digital data.

11. The method of operating a data storage device according to claim 1 wherein interpolating the second set of digital data using a selected fractional bit delay further comprises using a programmable fractional bit delay with a flat magnitude response and a linear phase response.

12. A method of operating a data storage device comprising:

detecting an error in processing a unit of data in a first mode of operation which includes converting an analog signal for a unit of data into first set of digital data representing voltage values using an analog-to-digital converter driven by a clock signal having a phase that is automatically adjusted based on feedback from the analog signal; and after detecting the error, re-reading the analog signal for the unit of data from media arid converting the analog signal for the unit of data into a second set of digital data representing voltage values using the analog-to-digital converter driven by a clock signal having a chase that is independent from the analog signal and wherein converting the analog signal for the unit of data into second set of digital data further comprises increasing the frequency of the dock signal over nominal to achieve over-sampling.

13. A data storage device comprising:

an analog-to-digital converter that converts an analog signal into digital data representing a voltage;

a programmable clock generator that supplies a clock signal to the analog-to-digital converter, the programmable clock generator having at least first and second clocking modes with the first clocking mode including automatic adjustment of the phase of the clock signal based on feedback and the second clocking mode that does not include automatic adjustment of the phase of the clock signal based on feedback; and means for recovering data after an error has been detected after processing a unit of data through the analog-to-digital converter using the first clocking mode, the means for recovering data including means for processing an analog signal for the unit of data through the analog-to-digital converter using the second clocking mode to generate digital data and means for storing the digital data in a sample buffer and means for interpolating digital data using a programmable delay line.

14. The data storage device of claim 13 wherein the a programmable delay line has a flat magnitude and linear phase response.

15. The data storage device of claim 14 further comprising means for iteratively processing digital data in the sample buffer at least first and second times and means for changing selected delay parameters for the programmable delay line between the first and second times.

16. The data storage device of claim 15 further comprising means for feeding the digital data in the sample buffer through a detector in a reverse order in at least one iteration.

17. The data storage device of claim 13 wherein the means for recovering data further comprises means for increasing the frequency of the clock signal above nominal to achieve over-sampling.

* * * * *